United States Patent [19]
Egly et al.

[11] 4,369,879
[45] Jan. 25, 1983

[54] MAGNETIC DISK STORAGE CASE

[75] Inventors: Robert A. Egly, 1630 Marguerite Dr., Corona del Mar, Calif. 92625; Patrick Sullivan, Tustin, Calif.

[73] Assignee: Robert A. Egly, Corona del Mar, Calif.

[21] Appl. No.: 226,621

[22] Filed: Jan. 21, 1981

[51] Int. Cl.³ .................. B65D 85/57; B65D 1/24
[52] U.S. Cl. .................. 206/45.18; 206/425; 206/444; 206/472; 220/23; 220/339
[58] Field of Search .......... 206/45.13, 45.18, 425, 206/387, 444, 472; 220/339, 334, 23

[56] References Cited

U.S. PATENT DOCUMENTS 4,225,038 9/1980 Egly .................. 206/45.18
4,231,474 11/1980 Takahashi .................. 206/387

FOREIGN PATENT DOCUMENTS 2202349 1/1972 Fed. Rep. of Germany ...... 206/425
2100464 7/1972 Fed. Rep. of Germany ...... 206/387

*Primary Examiner*—William T. Dixson, Jr.
*Attorney, Agent, or Firm*—George F. Bethel; Patience K. Bethel

[57] ABSTRACT

The following specification discloses a magnetic disk storage case that can be used for such disks, as well as other magnetic memory materials common to computers and word processing. The storage case is formed from a single molded piece of plastic, such as polypropylene in the form of a clamshell or book-like case, having a top and bottom cover. The top cover receives a support ledge having flexible barriers thereon to maintain the magnetic materials stored therebehind on the ledge. The bottom of the case receives the ledge and the magnetic disks therein within a surrounding wall. The entire top cover with the ledge and the disks therein can be accessed by means of a resilient living hinge that allows for the lid to be opened into a clamshell configuration and supported against a stop member, against one of the edge walls, or by means of a channeled arcuate groove in combination with a pin that functions therewith.

25 Claims, 9 Drawing Figures

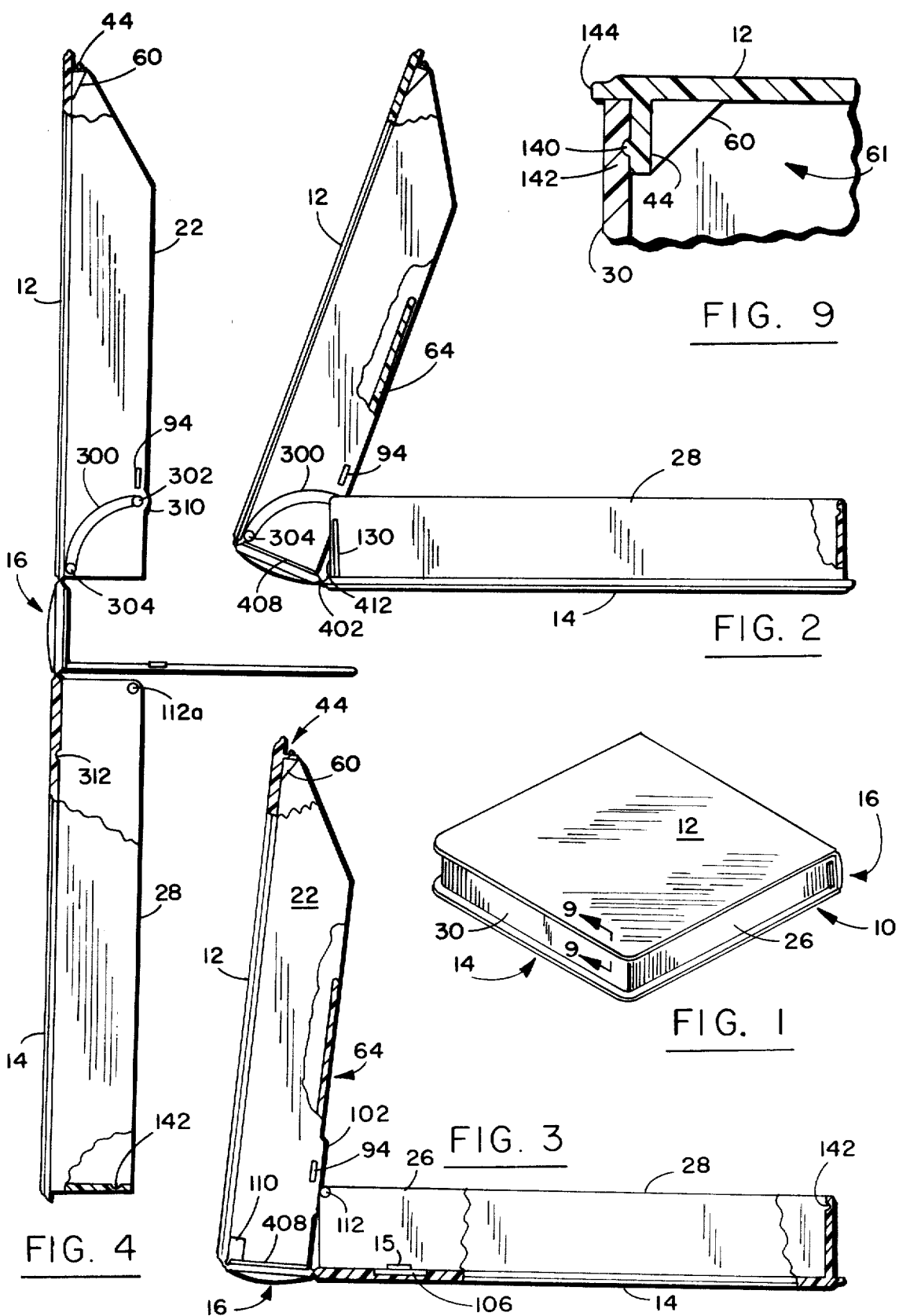

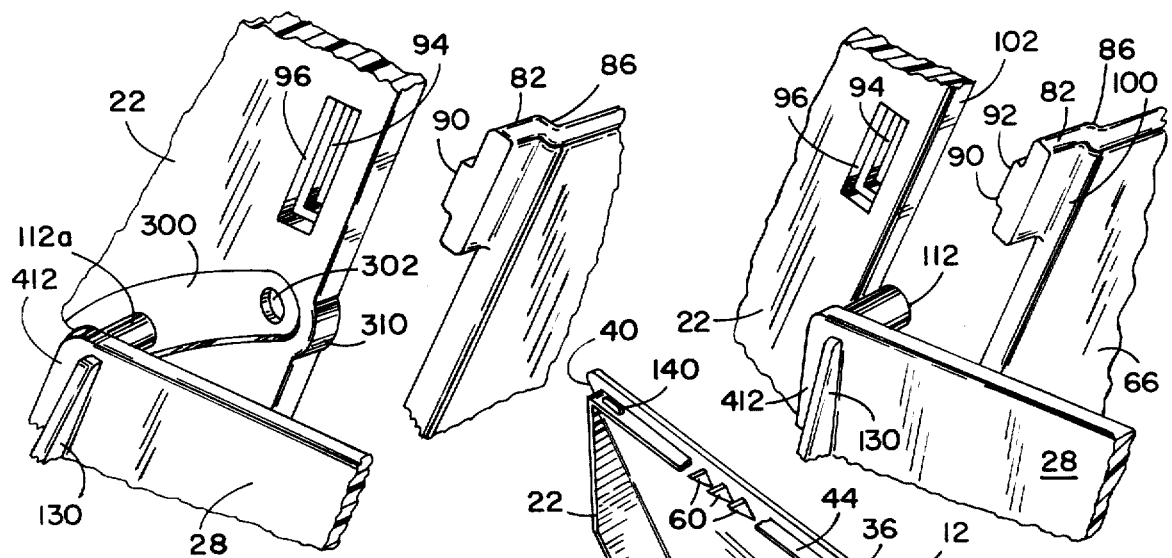
FIG. 7
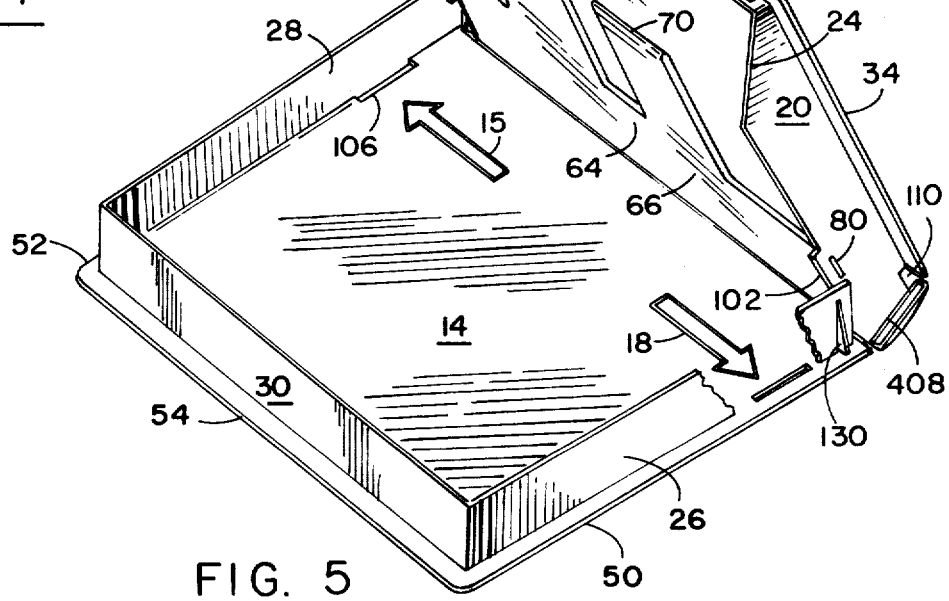
FIG. 8
FIG. 5
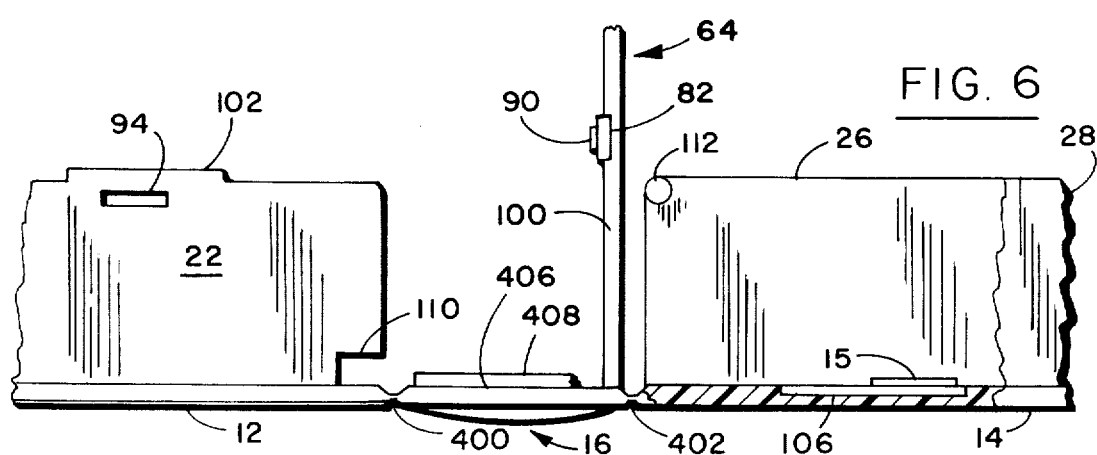
FIG. 6

MAGNETIC DISK STORAGE CASE

BACKGROUND OF THE INVENTION

1. Field of the Invention

The field of this invention lies within the art of storing magnetic memories, such as disks and diskettes. More particularly, it involves the storage on an accessable basis of such magnetic memory members for ease and facility of withdrawal therefrom to an operator in a simple and utilitarian configuration.

2. The Prior Art

The prior art with regard to magnetic memory storage cases is limited to the prior invention of one of the joint inventors herein and the art cited therein. In particular, one of the joint inventors is the inventor of U.S. Pat. No. 4,225,038 which issued Sept. 30, 1980. In that particular patent, the magnetic memories were stored on an insert that had a place for receipt of the magnetic members and was pivoted on a top portion thereof. The top portion allowed the tray-like member to swing inwardly into the lid and then be folded in the entirety as a three piece item.

The drawback of the device was specifically such that it had to be molded in more than one portion. Secondly, it was such that it used a substantially larger amount of raw material, in particular, plastic which is dependent upon petrochemical stocks. Furthermore, the device was not easily accessable for some people, due to the fact that it had to be folded outwardly, inwardly and closed upwardly and downwardly in a more cumbersome manner than this particular invention.

This invention overcomes the prior art by being made from a one piece injection molded conformation. The one piece conformation is such that it incorporates a ledge that is formed into the top of the clamshell-like member. The clamshell configuration opens so that it is hinged toward the rear and is in a resilient conformation so that it can rest against the sides of the bottom which have a projection against which it is rested.

The entire conformation utilizes a living hinge having sufficient resiliency to cause the lid to be opened and held, with the ledge and the magnetic memory members for easy access. The lid is not only supported by the base in a facile manner, but is also easily opened and closed by a single manipulation for easy access to the magnetic memory members on the ledge in the top of the case.

In addition to the foregoing features, the device is easily assembled as an entire singularly molded configuration having a ledge that attaches to the binding or hinge area, as well as a top and bottom integrated into one member for the support, display and ready accessability of magnetic memory members, such as disks. As a consequence, the invention is a substantial step over the prior art as to configuration, usage, manufacturing and overall features to enhance the storage, accessability and utilization of magnetic disks and diskettes.

SUMMARY OF THE INVENTION

In summation, this invention comprises a magnetic disk memory storage container formed from a single piece of plastic in a clamshell configuration with an upper lid having a ledge for the receipt of memory storage disks that are received within the base or bottom thereof and is connected by means of a living hinge.

More particularly, the invention comprises a booklike member that is opened and closed in a clamshell manner. The upper portion has a ledge built thereinto. The ledge is formed as a single piece on a web of hinge member between the upper and lower portions. The upper portion comprises an area for receipt of the ledge and lateral walls for preventing the memory storage members therein from moving outwardly.

The bottom has three upright walls that receive the top member that is folded there between, while at the same time having support means for holding the upper member in an open clamshell relationship by means of the resilient hinge and holding means.

The holding means can comprise one of two configurations. The first configuration has a pin and arcuate slot which receives the pin that rides therein and seats within a hole within the slot when it is in the open or extended position. The second configuration incorporates a protuberance, pin or obstruction, which allows the lid in the resilient open position to override it and then be received thereagainst. Afterwards, closing takes place by either spreading the walls to which the obstruction or pin is attached, or forcing the top to override the pins in a downwardly driven manner.

The foregoing configuration allows for facile opening, use, and manufacture of the magnetic memory disk storage device of this invention which shall be described in greater detail hereinafter.

DESCRIPTION OF THE DRAWING FIGURES

The invention will be more clearly understood by reference to the description below taken in conjunction with the accompanying drawings wherein:

FIG. 1 shows a perspective view of the storage case of this invention in its folded configuration;

FIG. 2 shows a side elevation view of the memory storage case with a portion of the top lid fragmented to show the ledge therein and is of an embodiment for holding the lid in its unfolded condition by means of an arcuate channel and pin;

FIG. 3 shows a side elevation view of the magnetic storage case of this invention in a partially fragmented form wherein the lid is resiliently received against a pin or protuberance of the lower wall portion of the bottom thereof;

FIG. 4 shows the disassembled one piece configuration of the embodiment shown in FIG. 2 as it is completely opened in a partially fragmented side elevation view;

FIG. 5 shows a perspective view of the configuration shown in FIG. 3 when the lid is in its opened position resting against the bottom of the storage case.

FIG. 6 shows a detailed fragmented partially sectioned side view of the hinge of the showing of the configuration of this invention in FIGS. 2 and 5;

FIG. 7 shows a perspective fragmented detailed disassembled view of the means by which the top is held open in the embodiments of FIGS. 2 and 4;

FIG. 8 shows a fragmented perspective view of the means for resting the top against the bottom of the magnetic memory storage walls of the device shown in FIGS. 3, 5 and 6; and, FIG. 9 shows the resilient latch means in cross section as shown in the direction of lines 9—9 of FIG. 1.

DESCRIPTION OF THE PREFERRED EMBODIMENTS

Looking more specifically at the drawings derived from FIG. 1 and the alternative embodiments thereof, it can be seen that the clamshell configuration of this invention has been folded together in a closed manner. The invention comprises a case 10 having an upper storage or lid section 12 and a lower portion 14. The two are joined together by a hinge member 16 spanning the upper and lower portion respectively 12 and 14. The upper portion or cover 12 has side walls 20 and 22 which are champered on their leading surfaces at their front portions such as front portion 24. The top or lid portion 12 nests between three walls on the base or bottom 14, specifically walls 26, 28 and front wall 30. The side walls 26 and 28 receive the walls 20 and 22 therebetween, while at the same time providing a support function as will be detailed hereinafter.

The clamshell configuration of the top and the bottom is such that an outer ledge or skirt 34 and 36 and 40 completely surrounds the walls 20 and 22, as well as a small front wall 44.

A second skirt on the base 14 surrounds the walls 26, 28 and 30 in the form of a skirt having portions 50, 52 and 54.

The foregoing skirts or side ledges on the walls provide significant resiliency and strength to the entire device. Furthermore, they allow the device to be formed in a manner so that the walls can provide an overall resting platform or leg upon which the device can rest.

Looking more particularly at the showings of FIGS. 3, 5, 6 and 8, it can be seen that the top or cover 12 has a lower frontal wall 44 at the front thereof. The frontal wall has a series of sloping angular uprights 60. The sloping angular uprights 60 are such that they provide for rigidity of the wall 44 and more importantly, ease and facility of withdrawal of magnetic memory disks as will be described hereinafter.

The lid 12 with its side walls 20 and 22 are such that they receive the magnetic memory disks therebetween resting on a ledge, generally shown as ledge 64. The ledge 64 comprises a transverse portion 66 and two upright portions 68 and 70. The upright portions 68 and 70 from the transverse portion are flexible in nature and allow for a displacement downwardly toward the base 14 for fanning and removal of magnetic memory disks that are implaced between the top inner surface of the top 12 and the ledge 64. These, in particular, thus permit the view through the spaces between the uprights 68 and 70 of the magnetic memories, while at the same time allow for flexible displacement and fanning of them. In operation the uprights and the transverse portion 66 should not be overly flexible to create a sag when the memory members are fanned, but yet at the same time be sufficiently flexible and resilient to provide support and fanning of the members therein.

The ledge 64 includes a pair of tabs 80 and 82 that are angularly offset from the transverse portion by means of a curved offset 86. The tabs 80 and 82 have an angular locking wedged tab 90 on the edge of each one that slopes backwardly on a slope 92 toward the base of the tab on which it is formed as a portion thereof, namely tab 80. The tab 80 is inserted into a slot 94 having a sloping surface 96 over with the angular tab 90 can be forced and locked in connection with the tab 80 being inserted therein.

The slot 94 is formed within the side walls 20 and 22 of the top cover 12 at the time of injection molding so that the entire device is formed as one piece. The transverse portion as can be seen in FIG. 6 is formed directly to the back portion 16 or hinge that can also be categorized as a binding of a book-like clamshell between the two respective top 12 and bottom portions 14.

In this manner, the ledge 64 is connected by means of the tabs 82 to the side walls 20 and 22, while at the same time permitting the ledge 64 to be formed in the entirety with the top and the bottom in the manner to be described.

The tabs 82 are offset with the bend 86 to allow for a relatively flush placement of the frontal leading surface of the ledge 64 along the bottom edges of the walls 20 and 22. This effectively provides for a frontal surface that can lie within the bottom 14 of the container without protruding with obtrusive edges.

The tabs 82 are easily snapped into place within the openings, or slots 94 with the overriding angle tabs 90 engaging the edges 96 thereof. The snapping configuration is achieved by the resilience of the walls 20 and 22 being of sufficient resilience to directly ride against the side edge 100 of the ledge 64. The angular tab 90, however, serves to enhance the locking function.

In order to provide for the slot 94 being formed in the side walls 20 and 22, an expanded ridge 102 is formed within the side walls 20 and 22 to allow for sufficient material to cover the slots 94. This expanded portion 102 is such that it not only provides for the expanded portion of the slots so that there is sufficient material in the area of the wall to allow for the slot 94, but also, it effectively allows for a resting of the top 12 against the bottom 14 within a groove 106 in the base of the bottom 14. The groove 106 allows for receipt of the ridge 102 so that the expanded portion can lie relatively flat within the bottom of the base 14 when it is in its folded condition.

Each side wall 20 and 22 incorporates an opening 110. The opening 110 receives a protuberance which shall be described hereinafter. The protuberance is used in a manner to rest the top against and serves a substantially important function in providing the effective holding of the top 12 when the clamshell configuration is in its open condition.

More particularly, a pin 112 has been shown on the side walls 20 and 22. The pin 112 can be any particular protuberance, expansion, knob or other obstruction against which the bottom edge of the walls 20 and 22 can rest against. In this particular case, it is seen that the ridge 102 having its bottom edge formed as a portion of the bottom edge of the walls 20 and 22 rests against pin 112. The ridge 102 effectively overrides the pin 112 in a flexible manner such that it allows for movement and displacement of the walls 20 and 22 over the pin and securement through the resilience of the back binding or hinge 16 in the open clamshell configuration.

The walls 26 and 28 to which the pin is connected are such that they have sufficient resiliency to flex and bias inwardly or laterally with respect to the bottom to provide the top 12 with an overriding capability when the protuberance or pin 112 is in the way thereof. However, it should be understood that the resilience must be sufficiently strong to drive the pin 112 inwardly so that after the walls 20 and 22 override the pin they will allow the pin to underlie and firmly support the top 12 in its open clampshell configuration. This is in part provided by a reinforcing rib 130 which is formed into the side walls 26 and 28. The reinforcing rib creates a situation wherein there is sufficient strength to reinforce the end regions of the walls 26 and 28 so that they will not unduly fatigue and collapse outwardly after significant usage. However, it should be understood that any reinforcement can be utilized to hold the walls 26 and 28 in resiliently fixed juxtaposition.

The bottom or base 14 is such that it is in relatively snug relationship to the top in its overlying locked configuration to provide for the locking action detailed in FIG. 9. The lock shown in FIG. 9 is effectuated by means of a relatively small rib 140 that is received within a groove 142 of the front wall 30. An overriding ledge 144 of the top 12 rests on the top portion of the wall 30. In this manner, the top portion 12 indexes on top of the wall 30 at the interior angle formed between the top 12 and a depending frontal portion of the wall, namely downwardly extending front wall portion 44. As previously stated, the downwardly conforming front wall 44 has a number of angular ribs 60 which allow for the withdrawal of magnetic memory members across their surface in the direction of arrow 61. Thus, they are able to slide over the interior surface of the downwardly depending skirt or wall 44 when removed from the ledge 64.

The overall configuration is such that it allows for a tight indexing of the top 12 and the bottom 14 so that the small ridge 140 can be seated effectively when the entire clamshell is closed within the groove 142 of the frontal wall 30.

Looking more particularly at FIGS. 2, 4 and 7, an alternative embodiment for allowing the top 12 to move upwardly and downwardly and be secured in the open clampshell configuration is shown. In this particular case, the bottom side walls 26 and 28 are analogous in all respects to the prior embodiment. Furthermore, the top side walls 20 and 22 are also analogous. All other details are also similarly numbered, such as the frontal wall portion 44 with the sloping ribs 60. Furthermore, the ledge 64 as shown in the other embodiments is connected by the same slot 94 and tab 82 type of configuration. In addition thereto, the bottom wall 28 incorporates a pin analogous to pin 112 but not always identical thereto because of the function that it must provide as hereinafter detailed.

In particular, a pin 112(a) has been shown formed with the wall 28 whereby it extends inwardly to engage an arcuate groove 300. The arcuate groove 300 terminates in a bottom through-hole 302 and an upper through-hole 304. The openings 302 and 304 respectively receive the pin 112(a) at the top and bottom portion of the swing of the top lid 12 when it is moved with the pin 112(a) riding and biased in the arcuate groove 300.

In order to provide for the through-hole 302, an expanded portion 310 of the top wall 22 is provided for. This is received within a bottom groove 312 when the top 12 is completely enclosed within the bottom 14.

The pin 112(a) is initially seated within the opening 304. As the top 12 is moved angularly backwardly, it causes the pin 112(a) to expand outwardly away from the opening 304 and ride within the arcuate groove 300 until it arrives within the through-hole 302 into which it is resiliently driven by the resilient biasing of the side wall 28 in conjunction with the resilience provided thereto, which can be enhanced by the rib 130 as previously explained.

The function of the groove 300 allows for an arcuate swinging guide to the top 12. There is sufficient support so that the top and the bottom 14 in the open clamshell condition generally shown in FIG. 2 or in the closed postion, as seen in FIG. 1 can be effectuated.

The hinge 16 is formed as a living hinge with the ledge 64 and has two narrow webs 400 and 402 which are analogous in both embodiments. The narrow portions 400 and 402 provide for a flexible opening and closing, yet sufficient resiliency to drive the top 12 against its resting pin 112, or pin 112(a) within the through-hole 302. A major spanning portion of the hinge 16 is formed with a substantial degree of material beyond the amount of the webs 400 and 402. This major portion 406 has an upright ridge 408 which is received on the exterior of the walls 26 and 28, so that its leading surface when in the closed position, engages the rib 130 and the sides of the wall 26 and 28. This effectively rigidifies the structure in the closed condition so that the upper leading edge 408 can be received as an outer rigidifying element to prevent outer expansion of the walls 26 and 28 when the container is in its closed configuration. The detail of this can be seen more effectively wherein the leading edge of the rib or ridge 408 would be placed within the space 412 that exists between the rib 130 and the trailing edge of the walls 26 and 28.

METHOD OF MANUFACTURE

The method of manufacturing the foregoing product is substantially such that it is formed from an injected molded plastic. The plastic can be in the form of polypropylene or any other suitable equivalent, such as polymers that have the flexibility and general equivalent resiliency of polypropylene when in the configuration in which it is formed.

The conformation of the injected molded item should be such that the binding 16 is formed as an integral item with the webs 400 and 402 between the top 12 and the bottom 14 in one integrated conformation. When the item is formed, it can be molded such that the item has the ledge 64 molded as one unitary item with the back of the binding 16 relieved so that the ledge 64 is not buckled. However, this is not absolutely necessary and other alternatives can be utilized to make this container. However, it should be understood that one of the outstanding features of this invention is that it is molded as a single unitary structure which includes the top 12, bottom 14, hinge 16 and ledge 64 formed as part of the living hinge.

After the unit has been formed and molded with all the openings, ridges, splines, grooves and other attendant items of this device, it can then be assembled. However, it should be understood that it is molded in the configuration generally shown in FIG. 4 and FIG. 6, wherein the ledge 64 is molded in situ as part of the entire device in the manner whereby it is formed on the binding or hinge 16. In its molded configuration, it serves to provide a resilient firm ledge 64 upon which the magnetic memory members, such as disks and diskettes can be stacked.

In order to have the ledge 64 connected to the top 12, the top is bent forwardly on the hinge point 400 until the ledge 64 with its tabs 82 are in direct alignment with the openings 94. In this manner, the tabs 82 are then wedged into the openings 94 and are retained by means of the angle tabs 90 engaging the sloping surface 96 of the opening 94. This thereby accommodates a locking in place. However, it should be understood there is a resilience of the side walls 20 and 22 of sufficient strength to hold the tabs 82 in place within the openings 94. This thereby completes the entire assembly of the device so it can then be utilized in its folded or unfolded configuration.

OPERATION

In operation, the case is utilized with approximately ten disks or diskettes resting on the interior between the ledge 64 and the inside surface of the top 12. They are held in place until the box is opened to its clamshell appearance. After the box has been opened, the pins of the configuration of FIG. 8 are overriden by the pins being pulled from the openings 110 into which they are normally indexed in the closed position. After overriding the openings 110, they then slide on the interior surface of the walls 20 and 22 until the walls override the pin and rest in the position shown in FIG. 8 on the pins 112. In this configuration, the top 12 serves to rest thereagainst by the resilience of the hinge 16 pulling the lid 12 forwardly against the surface of the pins 112 or any other protuberance or blockage formed on the walls 26 and 28 in an equivalent manner.

In order to close the container, the walls 20 and 22 can either be moved laterally outwardly to slide beyond the interior dimensions of the pins 112 or a forceful downward movement of the top 12 against the pins 112 can serve to override the pins 112 until the top 12 is completely folded into the base. Upon folding into the base, the ledge 64 rests against raised portions shown as arrows 15 and 18 that have been raised from the surface of the bottom so that the ledge rests thereon and the disks are not allowed to provide a substantial downward bending moment against the ledge 64. In addition thereto, the ridges 140 seat within the groove 142 in a manner whereby the tight juxtaposition of the entire device in its folded configuration provides a closure between the ridge 140 and the groove 142.

The foregoing generally comprises the entire disclosure of this device, as well as the method of manufacture and operation thereof. It is thought that it is a substantial step as to its clamshell configuration, its unitized structure and as to its overall configuration to be unobvious and novel over the prior art. Accordingly, the following claims should be used to construe the scope and spirit of the invention hereof.

We claim:

1. A container for magnetic storage material such as disks, magnetic cards and the like comprising:
    a clamshell-like opening and closing container having a bottom portion which generally provides a base and a receptacle for a top portion of said clamshell container which has been hinged thereto and which has a ledge within said top portion of said container for receipt of magnetic memory storage members between the ledge and the inner surface of said container;
    means for resiliently hinging said bottom and top member formed from a continuous hinge member between said top and bottom member;
    means for holding said top member open in a resting mode on said bottom member for exposure and access of magnetic storage members resting on said ledge between said top member and said ledge comprising a protuberance which can engage the bottom portion with respect to said top member;
    resilient side walls at least partially surrounding said bottom portion into which said top portion is received of sufficient resilience to allow said protuberance to override its engagement by flexing laterally to permit such disengagement; and,
    lateral walls on either side of said top portion in proximate relationship to said ledge for capturing magnetic memory members between said lateral walls, said ledge and said inner surface of said top member.

2. The container as claimed in claim 1 wherein said entire container is formed from one single piece of molded plastic.

3. The container as claimed in claim 2 wherein:
    said ledge is attached to said hinge in said molding process and further comprising means for connecting said ledge to the side walls of said upper cover.

4. The container as claimed in claim 3 wherein said means for attaching said ledge to the side walls of said container comprises:
    an opening within the side walls; and,
    a tab for receipt within the side walls of said container formed on said ledge.

5. The container as claimed in claim 4 wherein:
    said tabs have a further angular tab for receipt within the opening of said side walls of said upper portion of said container.

6. The container as claimed in claim 1 wherein:
    said protuberance means for supporting said upper portion comprises a pair of pins projecting inwardly from the portions of the walls surrounding said base and wherein said walls are sufficiently resilient to allow said top portion of said container to override said pins and be placed in a downward configuration.

7. The container as claimed in claim 1 wherein said means for supporting said upper portion with said lower portion comprises:
    a pin projecting from the interior wall of said lower portion extending into an arcuate groove having through-holes for receipt of said pin in an angular open and closed position.

8. A magnetic memory storage container comprising:
    a lower tray-like base having resiliently flexible side walls therearound on at least three sides thereof;
    an upper tray-like member having lateral walls on the sides thereof;
    a living hinge molded into said upper tray portion and said lower tray portion in a book-like binding to allow said upper tray portion to fold inwardly and outwardly between the walls of said lower tray portion;
    a ledge on said upper tray portion between the side walls of said upper tray portion forming a pocket between the interior of said upper tray portion and said ledge and having resilient fan tabs upon which magnetic media can be supported; and,
    protuberance means on said resiliently flexible side walls for engaging said upper tray portion with said lower tray portion in an open clamshell configuration for access to said magnetic memory members stored within said upper tray portion on said ledge, so that upon forced movement of said protuberance means they will override the engagement of the upper and lower portions by flexing said side walls.

9. The container as claimed in claim 8 wherein:

said upper tray portion has a ledge formed as an integral portion of the entire container and is a unitized connected structure so that it has a connected relationship between the upper tray portion and the lower tray portion and said ledge which is formed during a molding process for the container.

10. The container as claimed in claim 8 wherein:
said hinge between said upper tray portion and lower tray portion is formed of a plastic living hinge having a thin web portion for allowing bending at the connection points between said upper tray portion and said lower tray portion.

11. The container as claimed in claim 10 further comprising:
openings within said upper tray portion walls; and,
tabs on the lateral portions of said ledge for receipt within the openings of the walls of said upper tray portion.

12. The container as claimed in claim 11 further comprising:
angular locking tabs on said tabs of said ledge for receipt within said openings of said upper tray portion.

13. The container as claimed in claim 12 further comprising:
protuberances extending from the interior of the walls of said lower tray portion, against which said upper tray portion can rest thereon when it is in an open angular position.

14. The container as claimed in claim 13 further comprising:
a reinforcing rib in proximate relationship to said pin for reinforcing the walls in a laterally resilient manner of said lower tray portion.

15. The container as claimed in claim 14 further comprising:
a rib at the edge regions of the hinge on either side thereof which indexes and overrides the outer portion of said lower tray-like container walls for securing and being received against the sides of said lower container walls for holding it within a closed position.

16. The container as claimed in claim 8 wherein said means for holding said upper tray-like member against said lower tray-like member comprises:
an opening within the side wall of said upper portion at a point where the upper portion is opened in its supported relationship;
a pin on the interior side of said lower tray walls for receipt within said opening; and,
a second opening at the point where said container is closed for receiving said pin when the container is closed.

17. The container as claimed in claim 8 wherein:
the upper tray-like member has a skirt on the frontal portion thereof between said side walls; and,
a sloping surface interiorly of said skirt against which said magnetic memory members can be slid outwardly over the skirt.

18. The container as claimed in claim 17 further comprising:
a locking means on said skirt having means for engaging the front walls of said lower tray.

19. The container as claimed in claim 18 further comprising:
a ridge on the front of said skirt forming said locking means; and,
a groove within the front wall for receiving said ridge.

20. A unitized single injection molded container for magnetic memories such as disks and the like comprising:
a lower tray-like member having resilient lateral walls and a frontal wall spanning said lateral walls forming a base-like container therein;
an upper tray-like member having lateral walls with a minor wall extending therebetween across the frontal portion thereof;
a living hinge molded as an integral portion of said upper and lower tray-like members having a thinner web-like portion in connected relationship to the upper and lower portions at the point where they are joined and a thicker portion therebetween forming a binding between the two;
a ledge molded to said hinge along the lower portion thereof having a pair of tabs at either end;
openings within the lateral walls of said upper tray-like member for receipt of said tabs for holding said ledge in proximate relationship thereto;
a protuberance for engaging said upper tray-like member in an open upper position which can be overridden by said protuberance disengaging said resilient lateral walls; and,
a means for locking said upper tray-like member within said lower tray-like member.

21. The container as claimed in claim 20 wherein:
said protuberances are formed as pins extending inwardly from said walls upon which said upper tray-like member can rest in its open configuration with the resiliency of said hinge biasing said upper tray-like member thereagainst.

22. The container as claimed in claim 20 further comprising:
an arcuate groove having an opening for receipt of a pin extending as a protuberance of said inner portion of said tray-like member; and,
a second opening for indexing said pin when said upper tray-like member is in a closed position.

23. The container as claimed in claim 22 wherein said means for locking said upper tray-like member to said lower tray-like member comprises:
a respective ridge and groove on the interfacing portion thereof for holding them in juxtaposition.

24. The container as claimed in claim 30 wherein:
said protuberance of said lower tray-like member is reinforced by means of a rib extending on the outer walls of said lower tray-like member for reinforcing said area near said protuberance to provide an inner bias thereto of sufficient resiliency that can hold said upper tray in the open condition yet be overriden thereby when said upper tray-like member is pushed down thereagainst for closure.

25. The container as claimed in claim 24 wherein:
said tabs for securing said ledge to said side walls have an angular edge portion for receipt within said openings; and,
said openings have a matched angular portion for receipt of angular tabs.

* * * * *